United States Patent
Li et al.

(10) Patent No.: US 11,282,509 B1
(45) Date of Patent: Mar. 22, 2022

(54) CLASSIFIERS FOR MEDIA CONTENT

(71) Applicant: Facebook, Inc., Menlo Park, CA (US)

(72) Inventors: Shangwen Li, San Jose, CA (US); Jiantao Wu, Freemont, CA (US)

(73) Assignee: Facebook, Inc., Menlo Park, CA (US)

( * ) Notice: Subject to any disclaimer, the term of this patent is extended or adjusted under 35 U.S.C. 154(b) by 281 days.

(21) Appl. No.: 16/548,696

(22) Filed: Aug. 22, 2019

(51) Int. Cl.
| | |
|---|---|
| *G10L 15/18* | (2013.01) |
| *G06F 16/45* | (2019.01) |
| *G10L 25/84* | (2013.01) |
| *G06F 16/65* | (2019.01) |
| *G06N 20/00* | (2019.01) |

(52) U.S. Cl.
CPC .......... *G10L 15/1815* (2013.01); *G06F 16/45* (2019.01); *G06F 16/65* (2019.01); *G06N 20/00* (2019.01); *G10L 25/84* (2013.01)

(58) Field of Classification Search
None
See application file for complete search history.

(56) References Cited

U.S. PATENT DOCUMENTS

| | | | |
|---|---|---|---|
| 7,483,618 B1 | 1/2009 | Edwards et al. | |
| 8,601,596 B2 | 12/2013 | Wu et al. | |
| 9,524,490 B2 | 12/2016 | Rubinstein et al. | |
| 9,959,250 B2 | 5/2018 | Marra et al. | |
| 10,194,203 B2 | 1/2019 | Avila et al. | |
| 10,671,854 B1 | 6/2020 | Mahyar et al. | |
| 10,679,067 B2 | 6/2020 | Li et al. | |
| 11,019,300 B1* | 5/2021 | Baxendale | H04N 5/445 |
| 2003/0126267 A1 | 7/2003 | Gutta et al. | |
| 2013/0152211 A1 | 6/2013 | Wu et al. | |
| 2013/0238318 A1 | 9/2013 | Enoki et al. | |
| 2015/0070516 A1 | 3/2015 | Shoemake et al. | |
| 2016/0294755 A1 | 10/2016 | Prabhu | |
| 2017/0289624 A1 | 10/2017 | Avila et al. | |
| 2018/0341878 A1 | 11/2018 | Azout et al. | |
| 2019/0102144 A1* | 4/2019 | Roblek | G06N 3/08 |
| 2019/0121866 A1 | 4/2019 | Garg et al. | |
| 2019/0297042 A1 | 9/2019 | Prabhu | |
| 2020/0142999 A1 | 5/2020 | Pedersen | |
| 2020/0196011 A1 | 6/2020 | Wyatte et al. | |
| 2021/0058352 A1 | 2/2021 | Fogu et al. | |

OTHER PUBLICATIONS

EP Search Report for Application No. 20190119, dated Sep. 17, 2020, 8 pages.
Anonymous, "Optical Character Recognition—Wikipedia," Jul. 13, 2019, XP055724546, Retrieved from the Internet: URL:https://en.wikepedia.org/w/index.php? title=Optical_character_recogniation &oldid=906050239 [retrieved on Aug. 24, 2020], 11 pages.
Office Action for U.S. Appl. No. 16/548,686, dated Mar. 19, 2021, Li, "Classifiers for Media Content", 18 pages.

* cited by examiner

*Primary Examiner* — Quynh H Nguyen
(74) *Attorney, Agent, or Firm* — Lee & Hayes, P.C.

(57) ABSTRACT

Techniques are described that classify content, and control whether and how the content is shared based on the classification(s). In some examples, video content may be classified based on sequential image frames of the video, and time between the sequential image frames. Audio content may be classified based on combining classifications of multiple sound events in the audio signal. The classifications may be used to control how the content is shared, such as by preventing offensive content from being shared and/or outputting recommendations or search results based on the classifications.

20 Claims, 6 Drawing Sheets

CLASSIFIERS FOR MEDIA CONTENT

BACKGROUND

Digital platforms such as text messaging, instant messaging, email, social media, gaming, or other applications by which users can share content provide users with numerous benefits and opportunities. For instance, users may share information, media, and other types of content with family, friends, colleagues, and even strangers. Classification of content shared by users into different categories on a digital platform may provide users with a number of benefits, such as improved search results, enhanced recommendations, and preventing the sharing of potentially offensive content. However, the classification of content shared by users via these digital platforms is not without problems. For example, analyzing content, to identify people and other objects depicted in video and/or events recorded in audio, and to classify what the content is "about" may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
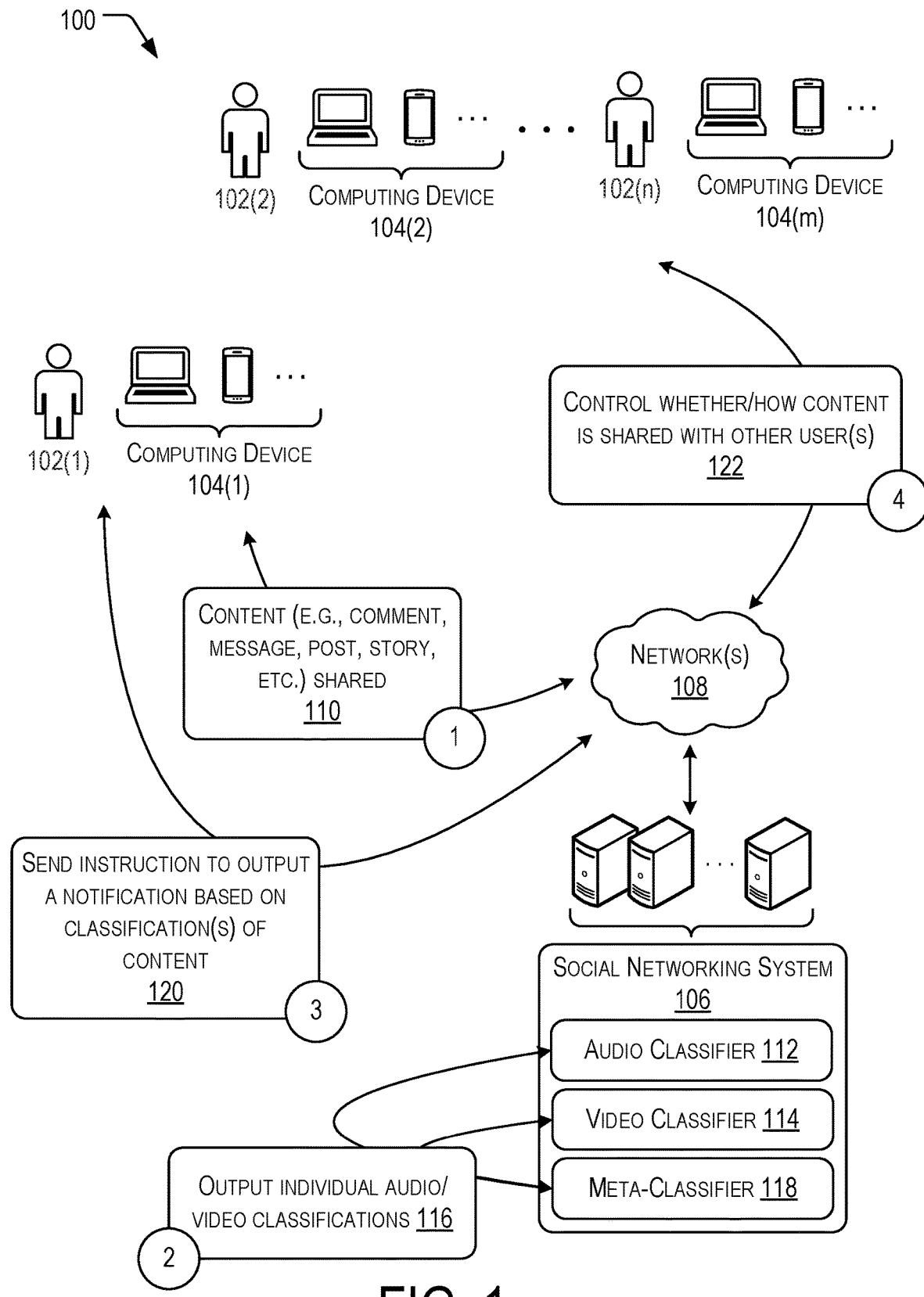
FIG. 1 is a schematic view of an example system usable to implement example content analysis techniques described herein.

As discussed above, classifying different types of content shared on digital platforms may present challenges. For instance, content can take a number of forms (e.g., text, image, video, audio, or a combination of these), and the number of ways to share content is ever growing. In some cases, content may be offensive to other users. Offensive content may be linked with cyberbullying, which may include threats, hate speech, degrading or shaming an individual, sharing of personal information in a way that is meant to blackmail or harass someone, and repeated, unwanted messages, to name a few examples. Offensive content may also include encouragement of violence, threats of harm to public and personal safety (e.g., specific threats of physical harm, threats of theft, vandalism, and other financial harm), glorification of self-injury, other types of graphic content, obscenity, and/or nudity. Offensive content can have negative, serious and lasting consequences for both the person sharing the content and consumers of the content including hurt feelings, reputational damage, and in more extreme cases depression, substance use, and suicide. Therefore, detection and classification of offensive content may reduce the amount of offensive content disseminated via digital platforms before offensive content is shared with other users, thus reducing these negative outcomes.

In some cases, accurate and reliable content classification may provide additional benefits beyond identifying offensive content before offensive content is shared with other users. For example, existing techniques for providing content recommendations and/or search results often rely on metadata manually associated with the content, or simple tags such as a time stamp, camera type, or location that the content was captured. Human additions of metadata to content to specify categories that the content may be associated with often leaves gaps in what the content is "about," as it can be difficult for a human to identify all possible categories that may be associated with the content. Additionally, tags generated to be included in content metadata often only relate to where, when, and/or how the content was captured, or specific people, accounts, or locations depicted in the content, but not what the content itself is "about." Accordingly, detection and classification of different content types using the described techniques may improve content recommendations and/or search results by identifying, from what is included in the video or audio itself, what the content is "about," along with other content having similar characteristics.

This application describes techniques for classifying content, and controlling whether and how the content is shared based on the classification(s). In some examples, the techniques described herein may classify video content and/or audio content as being potentially offensive to other users, such as by classifying objects in a video over a time period and/or identifying offensive events in an audio signal. When content is identified as being potentially offensive, whether and how the content is shared with other users may be controlled. For instance, the content may be prevented from being shared with the other users, a notification may be output to the user sharing the content that the content may be offensive, and/or the user sharing the content may be able to withdraw or edit the content to be less offensive.

Alternatively or additionally, the techniques described herein may classify video and/or audio content to improve recommendations for users, and/or to enhance search results when users are looking for a particular type of content. For instance, the described techniques may provide one or more classifications for an item of content shared by a user, which may be used to generate search results when the user or another user performs a search that includes a search term associated with one of the classifications.

In some examples, recommendations are suggestions of content for a user that are similar, in some way, to other content that the user has consumed. Previous systems often relied upon metadata, tags (e.g., hashtags, tags of user accounts in an image or video that include user accounts "followed" by the user, and so forth), shared "likes," comments, people followed by the user, and so on to generate recommendations. However, these previous techniques may not account for similarities in content itself, for instance, whether the content of one video was similar to the content of another video, and/or whether the content of one audio signal was similar to the content of another audio signal. Therefore, the described techniques classify what the video and/or audio signal is "about." What the content is "about" may be based on a semantic representation of who and/or what is included in the content (e.g., a noun-related entity such as a person, animal, object, etc.), and what is being done in the content (e.g., a verb-related activity such as talking, running, fighting, sitting still, etc.), and in some cases may include descriptors of what is included and/or what is being done (e.g., an adjective- or adverb-related descriptor such as a color, size, shape, duration, etc.). An item of content may include multiple semantic representations, even for relatively simple items of content such as an image. A semantic representation of the content may provide improved recommendations for users to consume content similar to what they like or are interested in, and/or to avoid or limit recommending content that the user dislikes or with which they are disinterested.

In some examples, a user may initiate sharing of an item of content from the user's social media account of a social media network. Sharing content from a social media account may take a variety of forms, such as a profile or feed post, a story, a direct message to one or more other users, a tweet, or a snap, to name a few examples. In general, a profile (or feed) post may include text and/or media content items, such as images, video, and/or audio. The profile post may be published to the social media network for consumption by other users, and may be viewable by other users for as long as the user's social media account is active and/or the post is deleted by the user, although examples are considered in which the profile post is removed and/or deleted after an amount of time (e.g., one hour, one day, one week, etc.). In some cases, a profile post shared by the user may be included in respective content feeds of other users of the social media network that have "followed" the user, are "friends" with the user, are connections of the user, or are otherwise associated with the user.

A story may be similar to a profile post, in that the story may include text and/or media content items, such as images, video, and/or audio, is published to the social media network for consumption by other users, and may be included in a feed (although, in some cases, a separate feed from the profile post feed). However, a story may differ from a profile post in that the story may be shared only with a selected subset of the user's followers, and/or may be removed from being viewed by followers of the user's account after a certain period of time (e.g., one hour, one day, one week, etc.). A direct message may also include text and/or media content items, such as images, video, and/or audio, but in general, a direct message is shared with a single other user of the social media network, or a selected subset of other users of the social media network rather than shared with all of a user's followers.

In some cases, a social media network may include a page that provides content recommendations to a user, e.g., an "explore" page or a "browse" page. As noted above, recommendations are suggestions of content for a user that are similar, in some way, to other content that the user has consumed. Therefore, an explore page may be populated with content recommendations based on other content being similar, in some way, to other content that the user has consumed. An explore page may include profile posts, stories, or other types of content that are available for other users to consume (e.g., publicly available or available based on access privileges of the consuming user). In some examples, content presented on such an explore page may be based at least in part on classifications according to interests specific to a user. In some cases, a user's interests may be directly input by a user (e.g., by typing in one or more interests, selecting pre-populated interests from a list, etc.). However, in some examples, content presented in an explore page may be based on classifications of content that the user has previously viewed and/or listened to, and how similar classifications of other content is to the classifications of content that was previously viewed and/or listened to, such as according to the described techniques.

As noted above, the variety of content sharing opportunities provided by profile posts, stories, direct messages, content recommendations, and other types of communications may allow for sharing of offensive content, which may result in negative consequences. Additionally, search results and content recommendations previously provided to users often rely upon incomplete information about the content, and may provide results and/or recommendations that are unrelated to what the user is interested in. Therefore, the described techniques provide classifications of content before, during, and/or after the content is shared in a profile post, story, or direct message, where the classifications are based, at least in part, on what is included in the content itself.

In some examples, a machine learning algorithm may classify video content based on multiple dimensions, such as the two dimensions (e.g., x and y dimensions) present in individual image frames, along with time between individual, sequential image frames as a third dimension. By evaluating time across multiple sequential image frames as a dimension in addition to the dimensions of the individual image frames, additional information may be revealed about what the video is "about" (e.g., what is happening in the video). In but one specific example, previous techniques that analyzed video based on individual image frames would often fail to detect fighting in a video, as many of the individual image frames would simply appear to depict two (or more) people standing near one another. However, by employing the described techniques that incorporate time between individual frames to analyze video, fighting is detected more frequently and with greater accuracy. In yet another specific example, previous techniques that analyzed video based on individual image frames would fail to differentiate between actions such as taking items out of a bag, versus putting items into the bag. The techniques described herein leverage temporal information between individual frames of the video, which can be used to differentiate between taking items out and putting items into the bag.

Additionally, in some examples, a machine-learning algorithm may be used to detect sound events in an audio signal, and combine or aggregate the classifications of individual sound events to determine what is "happening" in the audio signal. Consider an audio signal that includes a number of sighs and grunts, which may be determined to indicate that the audio signal includes people fighting. In a first scenario, the audio classifier may also detect, in a portion of the audio signal, a bell ringing to indicate that the fight is part of a boxing match, and thus would not necessarily classify the fighting as being offensive or objectionable. In another scenario, if the audio classifier detects a person screaming or a gun shot, the audio classifier may flag the content as offensive, and escalate the content for further review for offensiveness and/or withhold the content from being shared.

Various embodiments of the present disclosure include systems, methods, and non-transitory computer-readable media of a social networking system. In some examples, a social networking system may receive a video comprising multiple image frames, and select a subset of the multiple image frames, where the multiple image frames are sequential frames of the video. The social networking system may input the subset of the multiple image frames into a machine-learned model trained to detect and classify objects in videos, and receive, from the machine-learned model, an object detected in the subset of the multiple image frames and a classification of the object across the subset of the multiple image frames. The social networking system may determine a score based at least in part on the classification of the object across the subset of the multiple image frames, and control sharing of the video with one or more user accounts based at least in part on the score.

In some examples, the subset of multiple image frames are consecutive frames of the multiple image frames.

In some examples, the machine-learned model is trained to detect and classify the objects based at least in part on a time between individual frames in the videos.

In some examples, the machine-learned model is trained to detect a person or an animal engaged in fighting.

In some examples, the machine-learned model is trained to detect animal cruelty, nudity, or sexually explicit acts.

In some examples, a number of frames in the subset of the multiple image frames is selected based at least in part on an action that the machine-learned model is trained to detect.

In some examples, the machine-learned model is further trained to detect and classify the objects in the videos based at least in part on one or more colors in one or more pixels of frames of the videos.

In some examples, the machine-learned model is a first machine-learned model, and the social networking system further inputs the score for the object into a second machine-learned model trained to determine offensiveness of content. The social networking system may receive, from the second machine-learned model, an offensiveness level of an item of content that includes the video, and control sharing of the content based at least in part on the offensiveness level.

In some examples, the score corresponds to an offensiveness level associated with the video, and controlling sharing of the video includes preventing the video from being shared responsive to the score being higher than a threshold score.

In some examples, a social networking system may receive a video that includes multiple image frames, and select a subset of the multiple image frames that are sequential frames of the video. The social networking system may input the subset of the multiple image frames into a machine-learned model trained to detect and classify objects in videos, and receive, from the machine-learned model, an object detected in the subset of the multiple image frames along with a classification of the object across the subset of the multiple image frames. The social networking system may control sharing of the video with one or more user accounts based at least in part on the classification of the object across the subset of the multiple image frames.

In some examples, the social networking system shares the video in response to a search by the one or more user accounts, where the search includes a search term associated with the classification of the object.

In some examples, the social networking system shares the video by determining an interest associated with the one or more user accounts based on prior content viewed by the one or more user accounts, and shares the video with the one or more user accounts responsive to the interest being associated with the classification of the object.

In some examples, the social networking system shares the video with the one or more other user accounts based on a similarity of the classification of the object to a second object in one or more other videos viewed by the one or more user accounts.

In some examples, a social networking system may receive an audio signal, and input a portion of the audio signal into a machine-learned model trained to detect events in audio signals. The social networking system may receive, from the machine-learned model, a score associated with a sound included in the portion of the audio signal, where the score represents a first likelihood of the sound being of a sound type. The social networking system may combine, as a combined score, the score associated with the sound with one or more scores of one or more other sounds included in the audio signal, where the one or more scores represent a likelihood of the one or more other sounds being of the sound type. The social networking system may control sharing of the audio signal with one or more user accounts based at least in part on the combined score for the audio signal.

In some examples, the audio signal is in the time domain, and the social networking system generates a two-dimensional frequency domain representation of the audio signal by performing a transform (e.g., a Fourier transform) on a time domain representation of the audio signal. The social networking system may input the portion of the audio signal into the machine-learned model by inputting a second portion of the two-dimensional frequency domain representation into the machine-learned model that corresponds to the first portion of the audio signal in the time domain.

In some examples, the sound type is one or more of speech, a non-speech human sound, an animal sound, a gunshot, music, or an environmental sound.

In some examples, the sound type is speech, and the machine-learned model is further trained to determine a semantic meaning of the speech. The social networking system may receive, from the machine-learned model, a likelihood of offensiveness associated with the semantic meaning of the speech, and control sharing the audio signal based at least in part on the likelihood of offensiveness associated with the semantic meaning of the speech.

In some examples, the sound type is first music, and the social networking system determines a category of the first music, determines that a user account has played content including second music of the music category. The social networking system may control sharing of the audio signal by providing the audio signal as a recommendation to the user account based at least in part on the first music being of the music category and determining that the user account has played content including the second music of the music category.

In some examples, the audio signal is included in an item of content that further includes a video, and the social networking system may determine the portion of the audio signal to input into the machine-learned model by determining a potentially offensive portion of the video and determining a time of the potentially offensive portion of the video. The portion may be associated with a duration of time that includes the time of the potentially offensive portion of the video.

In some examples, the machine-learned model may be a first machine-learned model, and the social networking system may input the score for the audio signal into a second machine-learned model trained to determine offensiveness of the content. The social-networking system may receive, from the second machine-learned model, an offensiveness level of an item of content that includes the audio signal, and control sharing the audio signal based at least in part on the offensiveness level.

Any or all of the foregoing examples may be implemented alone or in combination with any one or more of the other examples. For instance, while examples are given that pertain to video classifiers, and examples are given with respect to audio classifiers, this application contemplates using the video classifier examples and audio classifier examples together in various combinations.

In addition to the societal improvements discussed above, the techniques described herein also improve performance of one or more computing devices by reducing an amount of content sent over a network. For instance, if any one of the described classifiers determines that the content to be shared by a user may be offensive, the content may be deleted from the user's computing device and may be prevented from being disseminated to other users' computing devices. In this way, the quantity of data sent over the network may be reduced. The quantity of data sent over the network may further be reduced by reducing a number of potentially offended users complaints, reducing tagging of offensive content, and/or reducing the number of blocked users. Additionally, in some examples, the described techniques may improve a user interface of a computing device by displaying a limited set of information to the user. For instance, the information displayed to a user in the form of a recommendation or search result curated by one or more of the described classifiers may improve efficiency of using a computing device by allowing the user to more quickly access content of interest to the user. Further, the speed of outputting content is improved by classifying content when shared, such that search results and/or recommendations can be generated faster than previous techniques. In this way, the user is presented with relevant content much faster (e.g., based on content classified by one or more machine-learned models) than existing techniques, which may require the user to navigate volumes of shared content, may rely on tagging of the content by other users over time, and/or may require the user to apply filters by selecting multiple controls in order to obtain relevant recommendations or search results.

These and other aspects are described further below with reference to the accompanying drawings. The drawings are merely example implementations, and should not be construed to limit the scope of the claims. For example, while examples are illustrated in the context of a user interface for a mobile device, the techniques may be implemented using any computing device and the user interface may be adapted to the size, shape, and configuration of the particular computing device. Also, while many of the examples are given in the context of offensive content, the techniques described herein may also be applied to, without limitation, aggressive content, threatening content, sexual content, abusive content, obscene content, or any other content that is objectionable to a user, with machine-learned models being trained to detect any or all of these types of content. Further, the techniques described herein may also be applied to identification of content items that are similar, one to another, content that is related to a topic of interest to a user, and/or content being recommended to a user as well.

Example System Architecture

FIG. 1 is a schematic view of an example system 100 usable to implement example techniques described herein to classify content shared by a user via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to help foster the safety and security of the users 102. For instance, the social networking system 106 may classify content shared by one of the users 102 via the social networking system 106. The social networking system 106 may use the classification to notify a user and/or restrict the presentation of potentially offensive content to be shared by the user, provide content recommendations, refine search results, and so forth.

For example, at operation 110 (indicated by "1"), the first user 102(1) disseminates content (e.g., a message, a post, a story, etc.) to the second user 102(2) and/or one or more other users 102(n). For example, the content may include a video and/or audio as part of a message sent from the first user 102(1) to the second user 102(2). In some examples, the content may include a video and/or audio as part of a profile post or a story by the first user 102(1), where the profile post or the story is shared to followers of the first user 102(1) that include the users 102(2)-102(n).

In some examples, the social networking system 106 may receive an indication that the computing device 104(1) intends to share the potentially offensive content according to the operation 110. The social networking system 106 may input the content received from the computing device 104(1) into one or more machine-learned models trained to detect objects and/or events in the content, and classify the content based on the detected objects/events. For instance, the content received from the computing device 104(1) may be input into an audio classifier 112 and/or a video classifier 114.

The audio classifier 112 may be a machine-learned model trained to detect and/or classify events in an audio signal included in the content received from the computing device 104(1). In some cases, the audio signal may be included as part of a video, although examples are considered in which the audio signal is not part of video content. In some examples, the audio classifier 112 may include an artificial neural network configured to detect and/or classify speech or other audio events (e.g., yelling, music, animal sounds, non-speech human sounds, vehicle sounds, gunshots, clicks, beeps, whistles, sirens, and so forth) in the audio signal. The artificial neural network of the audio classifier 112, in some examples, may include a convolutional and recurrent network that takes as input the audio signal, and outputs probabilities of different audio event types on a frame-level to a linear softmax function. The linear softmax function may then aggregate the frame-level probabilities into one or more recording-level (e.g., over the entire audio signal) probabilities by taking a weighted average with the probabilities of the different audio events as the weights of the weighted average. The audio classifier 112 may further include a speech recognition classifier trained to analyze speech included in the audio signal for negative speech such as bullying, hate speech, taunting, threats, blackmail, harassment, promotion of self-harm, and so forth, and/or positive or neutral speech as well. In some cases, the audio classifier 112 may output scores associated with detected audio events in the audio signal, such as a likelihood that an audio event corresponds to a particular sound type (e.g., on a scale of 0 to 1, a scale of 0 to 100, etc.). Additional details relating to the audio classifier 112 are discussed in relation to FIG. 2.

The video classifier 114 may be a machine-learned model trained to detect and/or classify objects in a video included in the content received from the computing device 104(1). In some examples, the video classifier 114 may include an artificial neural network configured to detect and/or classify objects in the video (e.g., persons, body parts, animals, weapons, filters added to the video, objects of various types, and so on). Further, the video classifier may classify the object based on time between individual, sequential (e.g., consecutive or non-consecutive) frames of the video, using time as an additional dimension to the two-dimensional depiction of the object in the individual frames. To analyze time as a dimension between individual image frames, the video classifier 114 may consist of a ResNet architecture that includes a (2+1)D convolution, where a 2D spatial convolution is followed by a 1D temporal convolution. By adding time as an additional dimension to the depiction of the object in individual frames, the video classifier 114 may be able to provide significantly more context in classifications of videos than in previous systems. For instance, incorporating time as an additional dimension may allow the video classifier 114 to detect an event such as fighting in a video, where previous techniques may not detect fighting using only a few disparate frames of a video. In some cases, the video classifier 114 may output scores associated with detected objects in a video, such as a likelihood that an object in the video corresponds to a particular object type (e.g., on a scale of 0 to 1, a scale of 0 to 100, etc.). Additional details relating to the video classifier 114 are discussed in relation to FIG. 2.

In examples, an operation 116 (indicated by "2") includes the audio classifier 112 and/or the video classifier 114 outputting individual audio and/or video classifications to a meta-classifier 118. While the system 100 depicts outputs from the audio classifier 112 and the video classifier 114 being output to the meta-classifier 118, the meta-classifier 118 may receive information from other sources as well, e.g., the content itself, a natural language processing component, an optical character recognition (OCR) component, and the like. The meta-classifier 118 may, in some cases, be a gradient-boosted decision tree trained to classify the item of content based on an offensiveness level of the content, e.g., by assigning an offensiveness score to the content that takes into account the classifications received from the audio classifier 112 and/or the video classifier 114. Alternatively or additionally, the meta-classifier 118 may be a neural network, and/or a gradient-boosted decision tree, trained to classify the item of content into one or more categories, such as news, fashion, sports, hobbies, food, décor, humor, travel, animals, cars, music, and so forth, based on the classifications received from the audio classifier 112 and/or the video classifier 114.

In some examples, the social networking system 106 may use the classifications output by the meta-classifier 118 in controlling whether potentially offensive content is shared, whether the user 102(1) is notified that content the user 102(1) intends to share may be potentially offensive to the other users 102(2)-102(n), in making content recommendations to the users 102 to content similar to what the users 102 have consumed in the past, and/or by outputting the content as a search result in response to a search by one of the users 102 that includes a search term associated with a classification of the content. Other examples of how the classifications of the content may be used are also considered.

For example, an operation 120 (indicated by "3") includes sending an instruction to the computing device 102(1) to output a notification based on one or more classifications of the content. For instance, the social networking system 106 may determine, based on a classification output by the meta-classifier 118, that the content that the user 102(1) intends to share may be potentially offensive to the other users 102(2)-102(n). In this case, the social networking system 106 may output a notification that the content will not be shared, or may give the user 102(1) an opportunity to revise or withdraw the content. In examples, the social networking system 106 may send an instruction to the computing device 104(1) corresponding to a category of the content detected by the meta-classifier 118, such as asking if the user 102(1) would like to view similar content to what they have shared, providing suggestions for editing the content (e.g., adding a music track that relates to a detected object in the video), and so forth.

Further, in some examples, an operation 122 (indicated by "4") includes controlling whether and/or how the content is shared with one or more other users. For instance, in the case of potentially offensive content, the social networking system 106 may prevent the content from being shared with the other users 102(2)-102(n), and/or reserve the content in a pending state until the user 102(1) verifies sharing of the content.

In some examples, as described above, the social networking system 106 may use classifications of the content by the meta-classifier 118 in providing content recommendations to the other users 102(2)-102(n). For instance, the social networking system 106 may determine that the user 102(2) has viewed five videos depicting cats in the past three days. In response to the user 102(1) sharing a video of a cat and the meta-classifier 118 determining that the video depicts a cat, the social networking system 106 may suggest the user 102(2) view the video shared by the first user 102(1).

Additionally, in examples, the social networking system 106 may use classifications of the content by the meta-classifier 118 in generating search results. In this case, the meta-classifier 118 may determine that content shared by the user 102(1) includes a tutorial of how to make a recipe. The social networking system 106 may receive a search from the user 102(2) such as, "quick recipe tutorial," and output the content received from the user 102(1) as a search result to the search input by the user 102(2), based on a similarity of the search term(s) to the classification(s) associated with the content.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In some examples, the social networking system 106 may provide privacy features to the users 102 while interacting with the social networking system 106. In particular examples, one or more objects (e.g., content or other types of objects) of the system 100 may be associated with one or more privacy settings. The one or more objects may be stored on or otherwise associated with any suitable computing system or application, such as, for example, the social-networking system 106, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system 106 or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
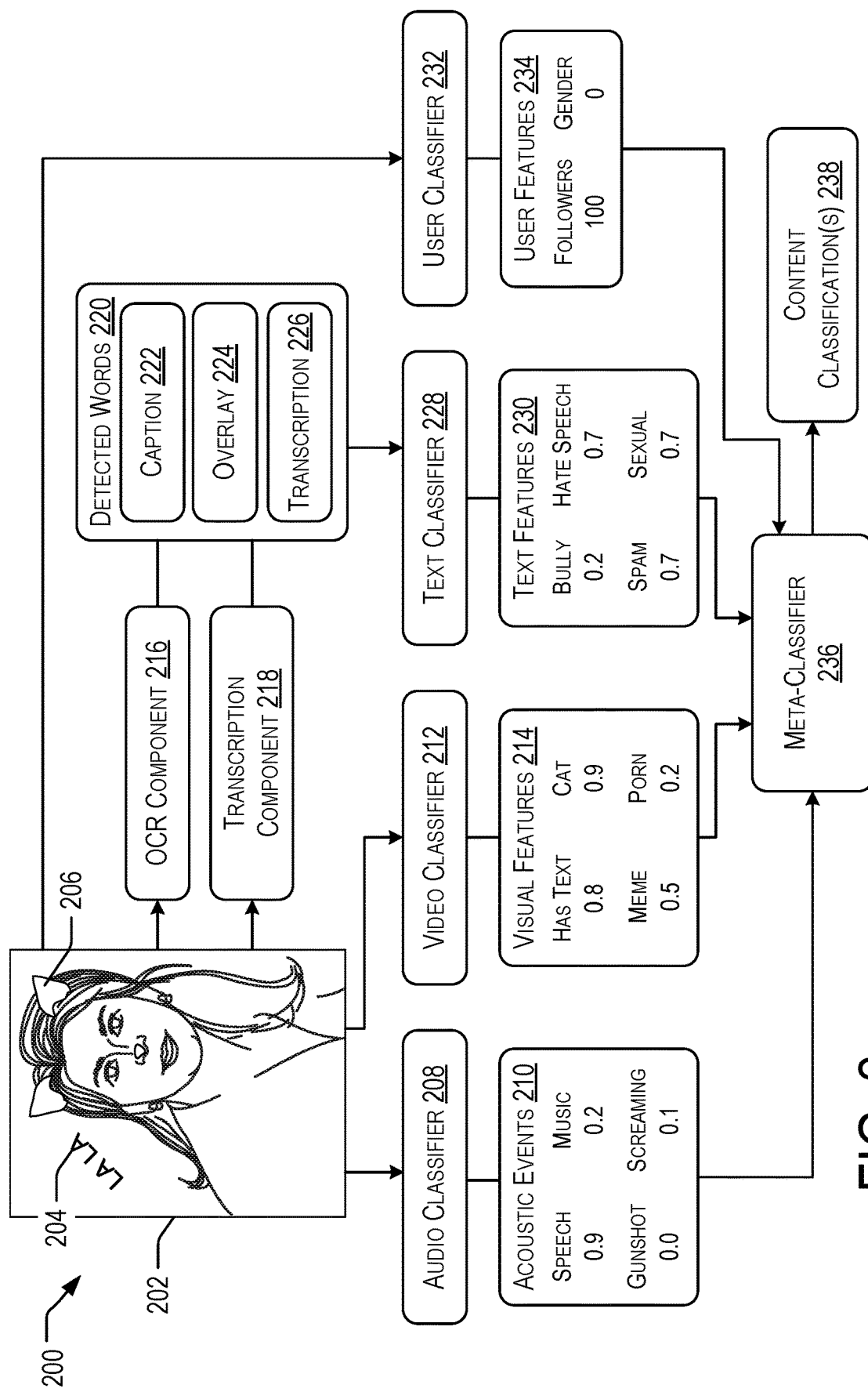
FIG. 2 illustrates an example classifier system usable to analyze content and output one or more content classifications associated with the content.

FIG. 2 illustrates an example classifier system 200 usable to analyze content and output one or more content classifications associated with the content. The classifiers and/or components may be utilized by a computing device of a social networking system (e.g., social networking system 106), the outputs of which may be used to control transmission of content to one or more user computing devices (e.g., computing devices 104) for presentation based at least in part on instructions received from the social networking system. As discussed above, the classifiers and/or components described in this section may, but need not, be implemented in the context of the system 100.

The example system 200 includes an item of content 202, which in this case may be a video that includes an audio signal, although other types of content are considered as well (e.g., video without an audio signal, audio signal without video, one or more images, text, etc.). The item of content 202 may be received by a social networking system (e.g., the social networking system 106 of FIG. 1) from a first user, where the first user intends to share the item of content with one or more other users via the social networking system. In this example, the item of content 202 also includes a text overlay 204 and a filter 206, which are displayed as part of the video as the video is played.

As described herein, the social networking system may input the item of content 202 into one or more machine-learned models trained to detect events and/or objects in the item of content 202, and classify the item of content 202 based at least in part on the detected events and/or objects. In some examples, an audio signal, or a portion of an audio signal, included as part of the item of content 202 may be input into an audio classifier 208 (e.g., corresponding to the audio classifier 112 of FIG. 1). While examples are considered in which an entire audio signal of the item of content 202 is input into the audio classifier 208, in some cases one or more portions of the audio signal may be selected to be input into the audio classifier 208 (e.g., to conserve processing resources, reduce processing time, etc.).

A portion of the audio signal may be selected to be input into the audio classifier 208 in a variety of ways. In some examples, "clues" from other types of content included in the item of content 202 may be used to select a portion of the audio signal to analyze. For instance, an event of interest may be detected in a video, such as a frame or frames at a particular time in the video that may include nudity. When an event of interest is detected, a portion of the audio signal (e.g., one second, three seconds, five seconds, etc.) corresponding to a duration of time surrounding the event of interest may be input into the audio classifier 208 to analyze the portion of the audio signal near or surrounding the event of interest. Additional details regarding selection of a portion of time based on an event of interest can be found in the discussion of FIG. 3.

In some examples, the audio signal may be received in a time domain from the user intending to share the content. In this case, the audio signal may be transformed (e.g., by a Fourier, Laplace, Z-transform, or other type of transform) into a frequency domain from the time domain. Generally, a time-domain graph of a signal shows how the signal changes over time, while a frequency-domain graph shows how much of the signal lies within each given frequency band over a range of frequencies. Therefore, a Fourier transform applied to a two-dimensional, time domain representation of the audio signal produces a two-dimensional, frequency domain representation of the audio signal.

The two-dimensional frequency domain representation may be used to determine a portion of the audio signal to input into the audio classifier 208. For instance, a particular frequency (or frequencies) may be selected from the range of frequencies in the frequency domain representation to be analyzed by the audio classifier 208. In an example, a human speech signal may be broken down into its component tones of different frequencies using a Fourier transform, and such frequencies may be identified as human speech by the audio classifier 208 based on detection of signals having the particular frequencies. Other sound events may be identified by the audio classifier 208 based on frequencies of the sound events, such as yelling, music, animal sounds, non-speech human sounds, vehicle sounds, gunshots, clicks, beeps, whistles, sirens, and so forth.

In some examples, the audio classifier 208 outputs one or more acoustic events 210 corresponding to events detected in the audio signal, and classified based on a likelihood that the event corresponds to a sound event type. In this example, the audio classifier 208 has output likelihoods for the different acoustic events 210 on a scale of 0 to 1, although any suitable scale may be used (e.g., 0 to 10, 0 to 100, etc.). The acoustic events 210 indicate that the item of content likely includes speech (e.g., likelihood of 0.9), and likely does not include music (e.g., likelihood of 0.2), a gunshot (e.g., 0.0), or screaming (e.g., 0.1). The depicted acoustic events 210 are intended only as examples of acoustic events, and are not intended to be limiting. Further, the audio classifier 208 may be trained to detect and/or classify any number of sound types. For instance, the audio classifier 208 may be configured to identify different categories of music, a semantic meaning of speech (e.g., offensive speech, hate speech, etc.), and so forth.

In some examples, a video, or a portion of a video, included as part of the item of content 202 may be input into a video classifier 212 (e.g., corresponding to the video classifier 114 of FIG. 1). While examples are considered in which an entire video of the item of content 202 is input into the video classifier 212, in some cases one or more portions of the video may be selected to be input into the video classifier 212 (e.g., to conserve processing resources).

In examples, a portion of the video may be selected to be input into the video classifier 212 in a variety of ways. Similar to the discussion above and discussed in more detail below in relation to FIG. 3, "clues" from other types of content included in the item of content 202 may be used to select a portion of the audio signal to analyze. For instance, an event of interest may be identified (e.g., from an audio signal) and used to determine a portion of the video to input into the video classifier 212. In some cases, the video may be divided into portions based on time (e.g., two-second clips, five-second clips, ten-second clips, etc.) and the portions may be input into the video classifier 212 individually, such as by inputting each of the clips, the first clip, the last clip, a middle clip, clips one- and/or three-quarters through the video, every other clip, every third clip, and/or a busiest (most visual change) clip, to name a few examples.

In some examples, the portion of the video may include sequential image frames of the video, and in some cases, may be consecutive image frames of the video, although examples are considered in which non-consecutive image frames (e.g., every other frame, every third frame, every fifth frame, every 10th frame, etc.) are used. The video classifier 212 may detect objects depicted in individual frames of the portion of the video to use in classification, but may also account for time between the individual image frames when classifying the objects in the portion of the video. For instance, the video classifier 212 may classify the objects based on how they change from one frame to another, to determine what the object is "doing" in the video (e.g., actions or events that are occurring in the video). In this way, the video classifier 212 may make classifications of the objects in a video that were not previously possible with conventional techniques that relied upon two-dimensional depictions of the objects in the image frames alone.

While the number of frames included in the portion may vary (e.g., 8 frames, 10 frames, 12 frames, 50 frames, etc.), in some cases, the number of frames may be selected based on an action that the video classifier 212 is trained to detect. In some examples, the video classifier 212 may be trained to detect fighting actions such as punching, kicking, headbutting, and so forth. Therefore, the video classifier 212 may receive a portion of the video corresponding to a duration of such actions, which may last between 0.5 and 1.5 seconds. If the user's computing device captured the video at 120 frames per second, the video classifier 212 may receive portions of the video between 60 and 180 frames at a time, in order to detect these types of actions. Of course, fighting actions and the described frame rate are intended only as examples, and other actions and number of frames included in a portion are considered.

The video classifier 212 may, in some cases, also detect and/or classify objects in a video based on one or more colors in one or more pixels in the image frames of the video. For instance, the video classifier 212 may evaluate RGB (or other type of color model) values for individual pixels of the image frames of the video to detect and/or classify objects in a video. Colors may be used to differentiate different objects, such as differentiating coffee from blood, a tree in the spring (when leaves are green) from the same tree in the fall (when leaves are orange), and so forth.

In some examples, the video classifier 212 outputs one or more video features 214 corresponding to events and/or objects detected in the video, and classified based on a likelihood that the event corresponds to a video feature type. In this example, the video classifier 212 has output likelihoods for the different video features 214 on a scale of 0 to 1, although any suitable scale may be used (e.g., 0 to 10, 0 to 100, etc.). The video features 214 indicate that the item of content likely has text (e.g., likelihood of 0.8) and includes a cat or cat features (e.g., likelihood of 0.9, corresponding to the filter 206), may possibly be a meme (e.g., likelihood of 0.5), and likely does not include pornographic material (e.g., likelihood of 0.2). The depicted video features 214 are intended only as examples of video features, and are not intended to be limiting. Further, the video classifier 212 may be trained to detect and/or classify any number of visual feature types. For instance, the video classifier 212 may be configured to identify a person or an animal engaged in fighting, animal cruelty, nudity, sexually explicit acts, sports, hobbies, food, news, and so forth.

The social networking system may include other classifiers as well, which may contribute information that may be used to classify the item of content 202. For instance, the social networking system may include an optical character recognition (OCR) component 216, which may be configured to convert an image of typed, handwritten, or printed text into machine-encoded text. In this case, the OCR component 216 may detect (or receive an indication from the video classifier 212 of the presence of) the text overlay 204 included as part of the item of content 202. The social networking system may also include a transcription component 218, which may be configured to generate a text representation from speech utterances included in the item of content 202. The transcription component 218 may detect the speech utterances independently, and/or may receive an indication from the audio classifier 208 and/or the video classifier 212 indicating the item of content 202 includes speech utterances to be transcribed.

The OCR component 216 and/or the transcription component 218 may output one or more detected words 220, which may include, as some examples, a caption 222, an overlay 224 (e.g., the text overlay 204), and/or a transcription 226. The caption 222 may be text included as part of the item of content 202 in a profile post by the user sharing the item of content 202. The transcription 226 may be a textual representation of speech utterances in the audio signal included in the item of content 202.

The detected words 220 may be input into a text classifier 228 trained to detect and/or classify one or more text features 230 in the detected words 220. For instance, the text classifier 228 may be configured to determine a semantic meaning of the utterances included in the audio signal of the item of content 202 by analyzing the transcription 226 of the utterances, or semantic meaning of the caption 222 and/or the overlay 224. In some cases, the text classifier 228 may determine a likelihood of offensiveness associated with the semantic meaning of the detected words 220, a type of music based on the semantic meaning of utterances in a song from the transcription 226, whether the item of content 202 is a tutorial based on semantic meaning of the transcription 226 or the caption 222 (and/or a type of tutorial described by the transcription 226 or caption 222), and so forth.

In some examples, the text classifier 228 outputs one or more text features 230 corresponding to semantic meaning of the detected words 220, and classified based on a likelihood that the detected words 220 correspond to a text feature type. In this example, the text classifier 228 has output likelihoods for the different text features 230 on a scale of 0 to 1, although any suitable scale may be used (e.g., 0 to 10, 0 to 100, etc.). The text features 230 indicate that the item of content 202 likely does not include bullying (e.g., likelihood of 0.2) but is relatively likely to include hate speech (e.g., likelihood 0.7), spam (e.g., likelihood of 0.7), and sexual references (e.g., likelihood 0.7). The depicted text features 230 are intended only as examples of text features, and are not intended to be limiting. Further, the text classifier 228 may be trained to detect and/or classify any number of text feature types.

In examples, the social networking system may also include a user classifier 232, which may be trained to detect different features of users. The user classifier 232 outputs likelihoods for one or more user features 234 corresponding to the user sharing the item of content 202. The user features 234 indicate that the user has 100 followers and a binary representation of the user's gender (e.g., 0 being female, 1 being male). The depicted user features 234 are intended only as examples of user features, and are not intended to be limiting. For instance, other user features that may be analyzed may include number of times content posted by the user has been flagged as offensive, number of times the user has been blocked or restricted by other users, and so forth.

In some examples, the social networking system may include a meta-classifier 236 (e.g., corresponding to the meta-classifier 118 of FIG. 1), which may be a machine-learned model such as a gradient-boosted decision tree trained to classify the item of content based on an offensiveness level of the content, e.g., by assigning an offensiveness score to the content that takes into account the classifications received from the audio classifier 208, the video classifier 212, the text classifier 228, and/or the user classifier 232. Alternatively or additionally, the meta-classifier 118 may be a machine-learned model such as a gradient-boosted decision tree trained to classify the item of content into one or more categories, such as news, fashion, sports, hobbies, food, décor, humor, travel, animals, cars, music, and so forth, based on the classifications received from the audio classifier 208, the video classifier 212, the text classifier 228, and/or the user classifier 232. The meta-classifier 236 may receive the likelihoods associated with the various acoustic events 210, the visual features 214, and/or the text features 230, and may combine these events/features with the user features 234 to classify the item of content 202. In this way, the meta-classifier 236 may "learn" what the item of content is about, and use the content classification(s) 238 that describe what the item of content 202 is about to control how the item of content 202 is shared.

As discussed above, the meta-classifier 236 may output one or more content classifications 238 based at least in part on the scores associated with the likelihoods included in the acoustic events 210, the visual features 214, and/or the text features 230, along with the user features 234. In some examples, the content classification(s) 238 may be used to control whether and/or how the item of content 202 is shared with one or more other users. For instance, if the meta-classifier outputs a content classification 238 indicating that the item of content 202 is likely to offend other users, the social networking system may withhold the item of content 202 from being shared, may output a notification to the user sharing the item of content 202 that the item of content 202 is likely to be considered offensive to other users, and/or may give the user sharing the item of content 202 an opportunity to revise the item of content 202 to be more respectful.

In some examples, the content classification(s) 238 may be used by the social networking system to output search results when a user searches for specific content. For instance, a user may search for "cat video" and based on the likelihood that the item of content 202 includes cat-like features (indicated by the score of 0.9 for "cat" in the visual features 214), the item of content 202 may be output as a search result. Of course, the acoustic events 210, the visual features 214, the text features 230, and/or the user features 234 may be used to select the item of content 202 as a search result when a user inputs a search term associated with any of the events/features.

Additionally, in some examples, the social networking system may use the content classification(s) 238 to provide content recommendations to users. The social networking system may determine an interest of a user account based on prior content consumed (e.g., viewed, listened to, etc.), and determine that a content classification 238 of the item of content 202 is associated with the interest of the user. In an example, the social networking system may determine that the user has previously viewed content with pictures or videos of Mexican food, and may output an item of content to the user as a recommendation that includes a recipe and tutorial for making tamales. In another example, the social networking system may control sharing of the item of content 202 by sharing the item of content 202 with a user account based on a similarity of an event or an object identified in the acoustic events 210, the visual features 214, and/or the text features 230, with another event or object consumed by the user account. For instance, if a user has consumed an item of content that included the filter 206, the user may be presented with a content recommendation that includes the same filter 206 (or a different filter), or if the user has consumed an item of content that describes how to change a bike tire, the user may be presented with content that includes bike tires or bikes.

Figure 3:
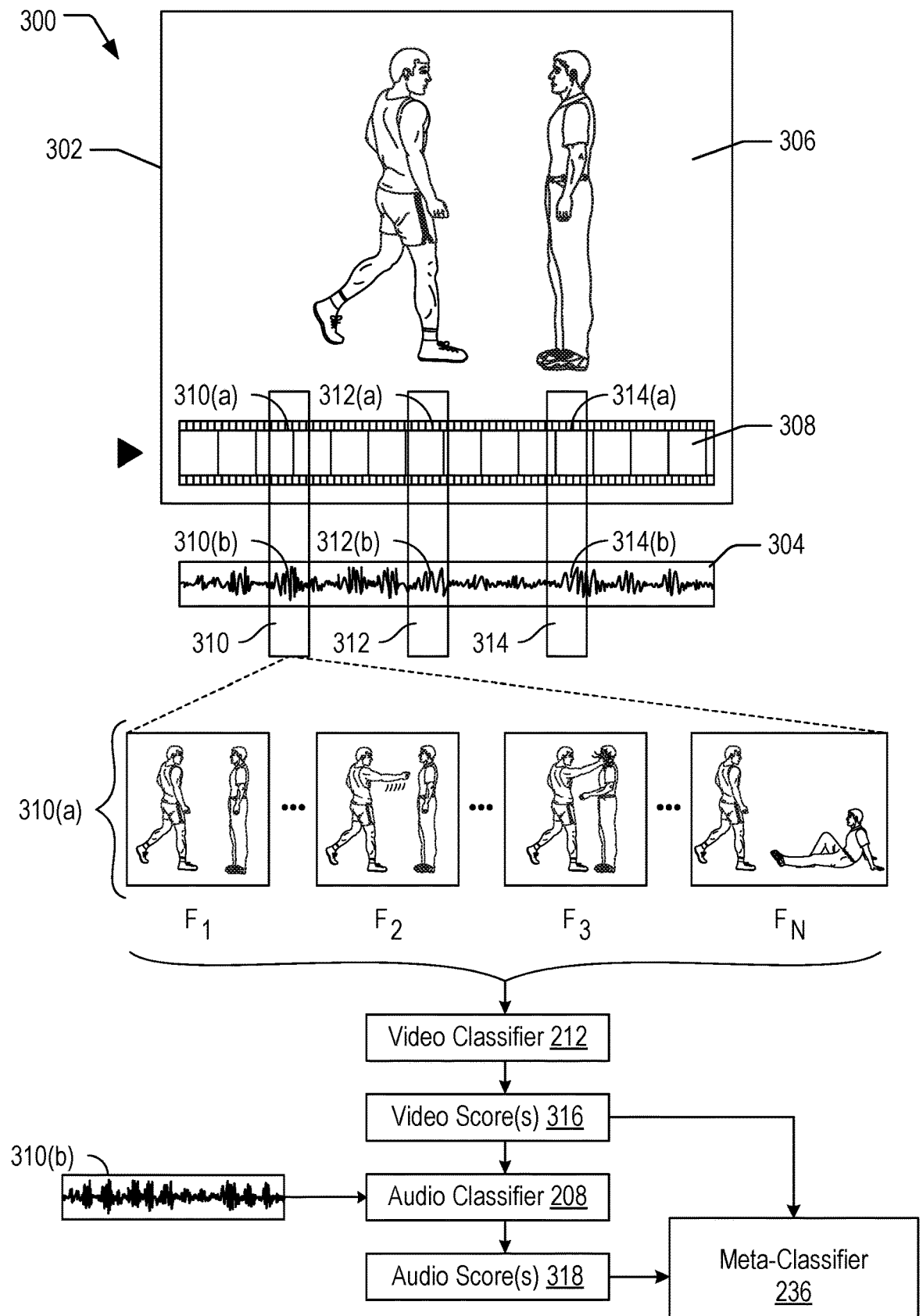
FIG. 3 illustrates an example system that includes an item of content, including a video and audio, which are analyzed to classify the content.

FIG. 3 illustrates an example system 300 that includes an item of content, including a video and audio, which are analyzed to classify the content. Similar to the discussion of FIG. 2, the classifiers and/or components may be utilized by a computing device of a social networking system (e.g., social networking system 106), the outputs of which may be used to control transmission of content to one or more user computing devices (e.g., computing devices 104) for presentation based at least in part on instructions received from the social networking system. As discussed above, the classifiers and/or components described in this section may, but need not, be implemented in the context of the system 100.

As noted above, the item of content includes different components, such as a video 302 and an audio signal 304. The video 302 is shown at a specific frame 306 of the video, in which it appears that two people are standing near one another. When considered on its own, previous systems would have difficulty deciphering what the video 302 was "about" if analyzing individual frames of the video 302, such as the frame 306.

Accordingly, the described techniques may analyze the video 302 by accounting for time as an additional dimension between individual frames of the video 302. A reel 308 represents the individual frames of the video 302 over a duration of the video 302, although not all of the frames are pictured for clarity. Portions of the video 302 and/or the audio signal 304 may be selected to be used to classify the item of content, such as a first portion 310 that includes a video portion 310(a) and a corresponding audio portion 310(b), a second portion 312 that includes a video portion 312(a) and a corresponding audio portion 312(b), and a third portion 314 that includes a video portion 314(a) and a corresponding audio portion 314(b). While three portions are pictured and described, the video 302 and the audio signal 304 may be divided into any suitable number of portions to analyze the video 302 and/or the audio signal 304.

The video portion 310(a) is shown in an expanded view, which includes a number of the individual frames ($F_1$, $F_2$, $F_3$, ... $F_N$) included in the video portion 310(a). The frames $F_1$, $F_2$, $F_3$, ... $F_N$ may be sequential frames of the video, and in some examples, may be consecutive frames of the video. The frame $F_1$ may correspond to the frame 306, which shows the two people standing near one another. However, as the frames $F_1$, $F_2$, $F_3$, ... $F_N$ are viewed as time passes, it is apparent that one of the individuals strikes the other, and the second individual falls to the ground.

The video portion 310(a) is input into the video classifier 212 (e.g., of FIG. 2), which may output one or more video scores 316, corresponding to the visual features 214 described in relation to FIG. 2. The video scores 316 may indicate that the portion 310 includes an event that may be of interest for further analysis of the item of content during or near the portion 310. For example, the video scores 316 may indicate that the video portion 310(a) includes potentially offensive content (e.g., people fighting). As a result, the video scores 316 and/or an indication that the portion 310 may include an event of interest may be input into the audio classifier 208. The audio classifier 208 may then analyze the audio portion 310(b) corresponding to the video portion 310(a), and output one or more audio scores 318 corresponding to the acoustic events 210 of FIG. 2. The video scores 316 and the audio scores 318 may be input into the meta-classifier 236, which may use the scores to determine a classification of the item of content that includes the video 302 and the audio signal 304. For instance, audio scores 318 may provide additional information as to what is "happening" in the portion 310, which when combined by the meta-classifier 236, provides a holistic representation of what the video is about and improves classifications of content.

While FIG. 3 depicts the video portion 310(a) being used to select a portion of the audio signal 304 to be analyzed based on an event of interest, it should be understood that an event of interest in the audio signal 304 may be used to determine a portion of the video 302 to analyze as well. For instance, as audio signal files are generally smaller than their video counterparts (e.g., in a single item of content and both being a generally similar time duration), processing resources may be conserved by analyzing the audio signal before the video to determine which portion(s) of the video to input into the video classifier 212 based on events of interest in the audio signal.

Example Methods

Various methods are described with reference to the example system of FIG. 1 for convenience and ease of understanding. However, the methods described are not limited to being performed using the system of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 4:
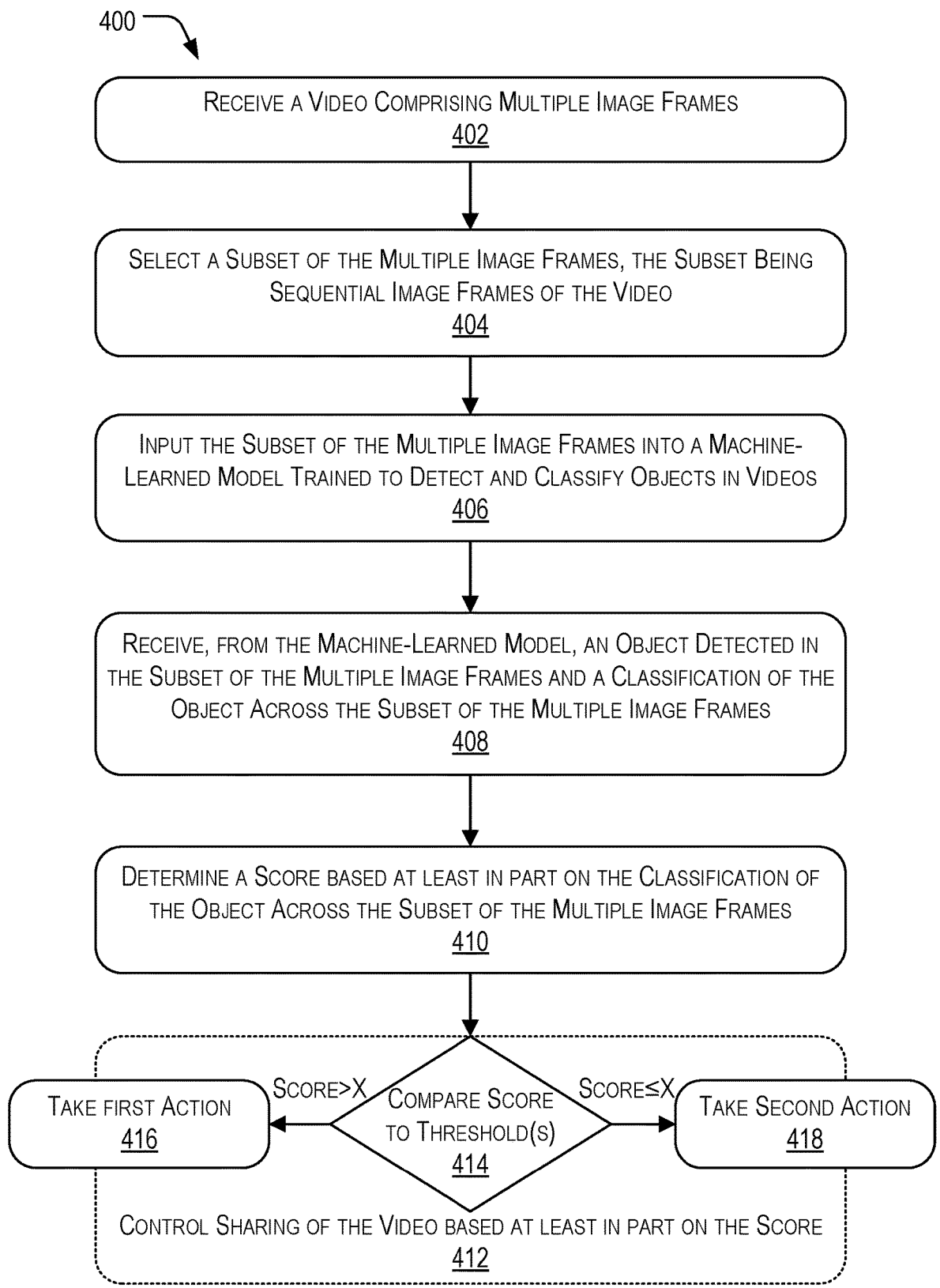
FIG. 4 illustrates an example process for analyzing sequential image frames of a video to classify objects or events depicted in the video, and controlling sharing of the video based at least in part on the classification.

FIG. 4 illustrates an example process 400 for analyzing sequential image frames of a video to classify objects or events depicted in the video, and controlling sharing of the video based at least in part on the classification.

At operation 402, the process can include receiving a video comprising multiple image frames. In some examples, the video may be included in an item of content being shared by a user account via the social networking system 106 with one or more other users.

At operation 404, the process can include selecting a subset of the multiple image frames, where the subset of the multiple image frames are sequential image frames of the video. In some cases, the sequential image frames may be consecutive image frames, although examples are considered in which the frames are non-consecutive while still being sequential (e.g., every other frame, every third frame, every fifth frame, etc.).

At operation 406, the process can include inputting the subset of the multiple image frames into a machine-learned model trained to detect and classify objects in videos. As discussed above, the video classifier 114 may include an artificial neural network configured to detect and/or classify objects in the video (e.g., persons, body parts, animals, weapons, filters added to the video, objects of various types, and so on). Further, the video classifier may classify the object based on time between individual, sequential (e.g., consecutive or non-consecutive) frames of the video At operation 408, the process can include receiving, from the machine-learned model, an object detected in the subset of the multiple image frames and a classification of the object across the subset of the multiple image frames. For instance, the classification of the object may be based on the detection of the object in the two-dimensional image frames, along with how the object changes from one frame to another by adding time as an additional dimension between the individual image frames. In some cases, the classification of the object may be based on other dimensions as well, such as color values of individual pixels in the image frames.

At operation 410, the process can include determining a score based at least in part on the classification of the object across the subset of the multiple image frames. In some examples, the score may correspond to an offensiveness level associated with the content, e.g., how likely the content is to be offensive to other users. Alternatively or additionally, the score may correspond to a likelihood of the object being a particular classification or category, such as a person, an animal, a meme, or an object, to name a few examples. The classification may in some cases include an action by the object across the multiple image frames as well, such as a person fighting, a person playing sports, an animal fighting, a person playing music, and so forth.

At operation 412, the process can include controlling sharing of the video based at least in part on the score. For instance, at operation 414, the score may be compared to one or more threshold scores, which may determine an action to take with respect to the video. When evaluating the video for offensiveness, for example, if the score is greater than a threshold offensiveness score, the process may proceed to an operation 416 where a first action is taken that withholds the video from being shared, presents the sharing user with a notification that the video may be offensive, and/or gives the sharing user an opportunity to revise and/or withdraw the video from being shared before sharing the video with other users. If the score is less than or equal to the threshold offensiveness score, the process may proceed to an operation 418, where the video is shared according to the content type (e.g., profile post, story, etc.). In some examples, controlling sharing of the video may further include combining the score with one or more other scores (e.g., by the meta-classifier 118) to determine whether an item of content that includes the video is potentially offensive to other users, and preventing sharing of the content if the content is determined to be offensive.

The social networking system 106 may also use the score to control sharing of the video by outputting the video as a recommendation and/or a search result in response to the sharing user and/or other users having an interest in the video. An interest in the video may be indicated by the sharing user or other user inputting a search term associated with the classification, or viewing other videos that are associated with the classification. For example, at operation 414, if the score is greater than a threshold score corresponding to a particular content classification, the process may proceed to the operation 416, where the first action may include including the video as a search result and/or a content recommendation. On the other hand, if the score is less than or equal to the threshold score corresponding to the particular content classification, the process may proceed to the operation 418, where the video is not included as a search result and/or a content recommendation.

Figure 5:
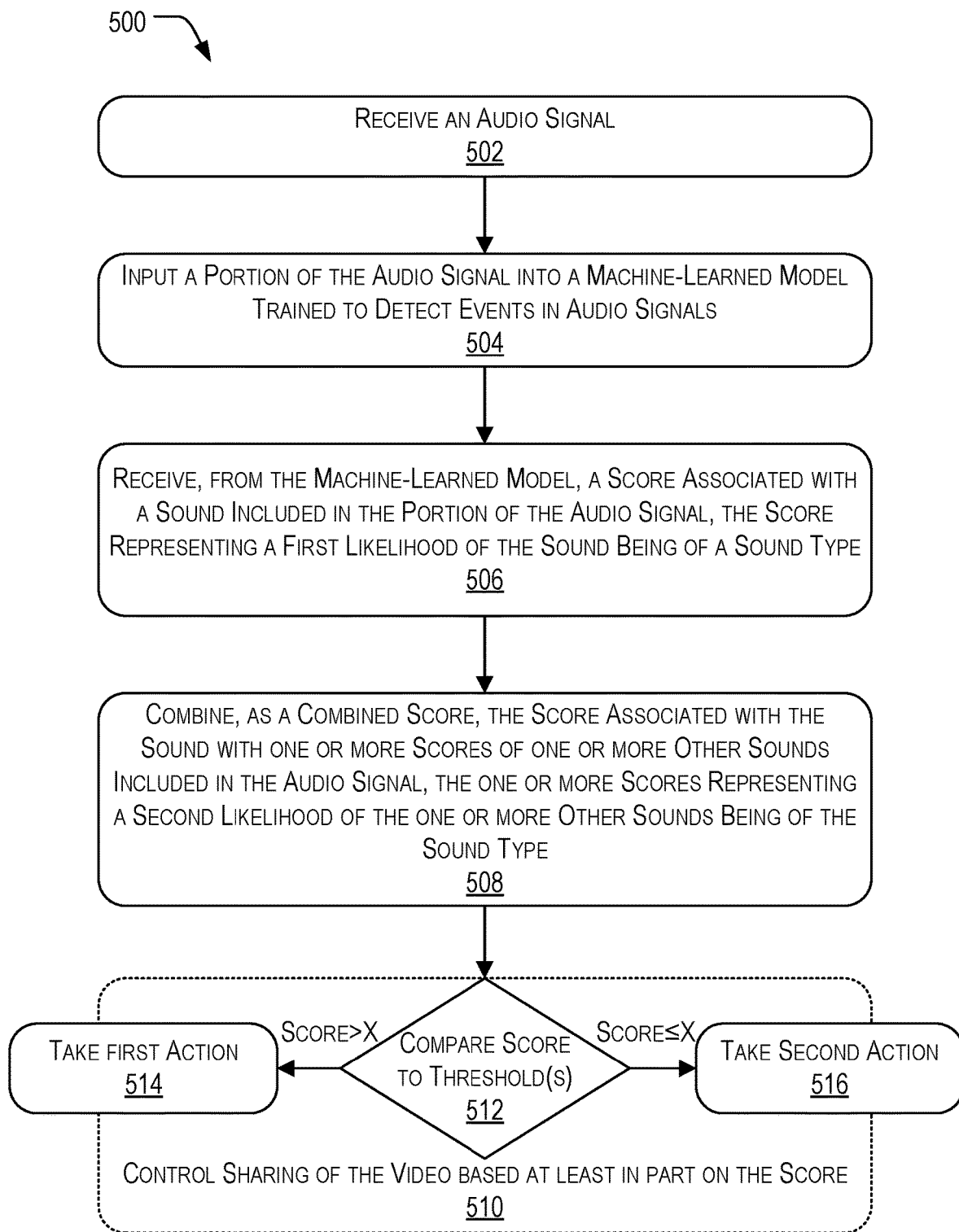
FIG. 5 illustrates an example process for analyzing a portion of an audio signal to determine a likelihood of a sound being in the portion of the audio signal, combining the likelihood of the sound being of the sound type with likelihoods of other sounds from the same or other portions of the audio signal being of the sound type, and controlling sharing of the audio signal based at least in part on a combined likelihood.

FIG. 5 illustrates an example process 500 for analyzing a portion of an audio signal to determine a likelihood of a sound being in the portion of the audio signal, combining the likelihood of the sound being of the sound type with likelihoods of other sounds from other portions of the audio signal being of the sound type, and controlling sharing of the audio signal based at least in part on the combined likelihood.

At operation 502, the process can include receiving an audio signal. In some examples, the audio signal may be included in an item of content being shared by a user account via the social networking system 106 with one or more other users.

At operation 504, the process can include inputting a portion of the audio signal into a machine-learned model trained to detect events in audio signals. In some examples, the portion of the audio signal to input into the machine-learned model may be selected by performing a Fourier transform on the audio signal to transform the audio signal from the time domain to the frequency domain, and selecting the portion from one of the indicated audio frequencies in the frequency domain. Alternatively or additionally, the portion of the audio signal may be selected by evaluating other types of content included in an item of content with the audio signal, such as a video. For instance, an event may be selected in the video that is of interest at a particular time in the video, and the portion of the audio signal surrounding the particular time (e.g., a one second window, a three second window, a five second window, etc.) may be selected to be input into the machine-learned model.

As discussed above, the audio classifier 112 may include an artificial neural network configured to detect and/or classify speech or other audio events (e.g., yelling, music, animal sounds, non-speech human sounds, vehicle sounds, gunshots, clicks, beeps, whistles, sirens, and so forth) in the audio signal. The audio classifier 112 may further include a speech recognition classifier trained to analyze speech included in the audio signal for negative speech such as bullying, hate speech, taunting, threats, blackmail, harassment, promotion of self-harm, and so forth, and/or positive or neutral speech as well.

At operation 506, the process can include receiving, from the machine-learned model, a score associated with a sound included in the portion of the audio signal, the score representing a first likelihood of the sound being of the sound type. In some cases, the first likelihood may correspond to whether the sound is speech, and/or what the speech is "about," e.g., hate speech, bullying, news, sports, food, a tutorial (e.g., describing the steps of a recipe, beauty routine, etc.), humor, television/movies, and so forth. Alternatively or additionally, the first likelihood may correspond to another sound type, such as non-speech human sounds, animal sounds, or environmental sounds such as gunshots, sirens, footsteps, vehicle noises, and so on.

At operation 508, the process can include combining, as a combined score, the score associated with the sound with one or more scores of one or more other sounds included in the audio signal, where the one or more scores represent a second likelihood of the one or more other scores being of the sound type. In other words, the social networking system 106 may look at the audio signal as a whole, and determine what the audio signal is "about" based on different sounds included in the audio signal. For instance, the audio classifier 112 may detect that the portion of the audio signal includes a gunshot sound, but may also detect in a different portion of the audio signal speech that includes a gun safety tutorial. Even though in this example the sounds are of different sound types, the audio classifier 112, for instance, may determine that the audio signal describes gun safety.

At operation 510, the process can include controlling sharing of the audio signal based at least in part on the score. For instance, at operation 512, the score may be compared to one or more threshold scores, which may determine an action to take with respect to the audio signal. When evaluating the audio signal for offensiveness, for example, if the score is greater than a threshold offensiveness score, the process may proceed to an operation 514 where a first action is taken that withholds the audio signal from being shared, presents the sharing user with a notification that the audio signal may be offensive, and/or gives the sharing user an opportunity to revise and/or withdraw the audio signal from being shared before sharing the audio signal with other users. If the score is less than or equal to the threshold offensiveness score, the process may proceed to an operation 516, where the audio signal is shared according to the content type (e.g., profile post, story, etc.). In some examples, controlling sharing of the audio signal may further include combining the score with one or more other scores (e.g., by the meta-classifier 118) to determine whether an item of content that includes the audio signal is potentially offensive to other users, and preventing sharing of the content if the content is determined to be offensive.

The social networking system 106 may also use the score to control sharing of the audio signal by outputting the audio signal as a recommendation and/or a search result in response to the sharing user and/or other users having an interest in the audio signal. An interest in the audio signal may be indicated by the sharing user or other user inputting a search term associated with the classification, or listening to other audio signals that are associated with the classification. For example, at operation 512, if the score is greater than a threshold score corresponding to a particular content classification, the process may proceed to the operation 514, where the first action may include including the audio signal as a search result and/or a content recommendation. On the other hand, if the score is less than or equal to the threshold score corresponding to the particular content classification, the process may proceed to the operation 516, where the audio signal is not included as a search result and/or a content recommendation.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example System and Device

Figure 6:
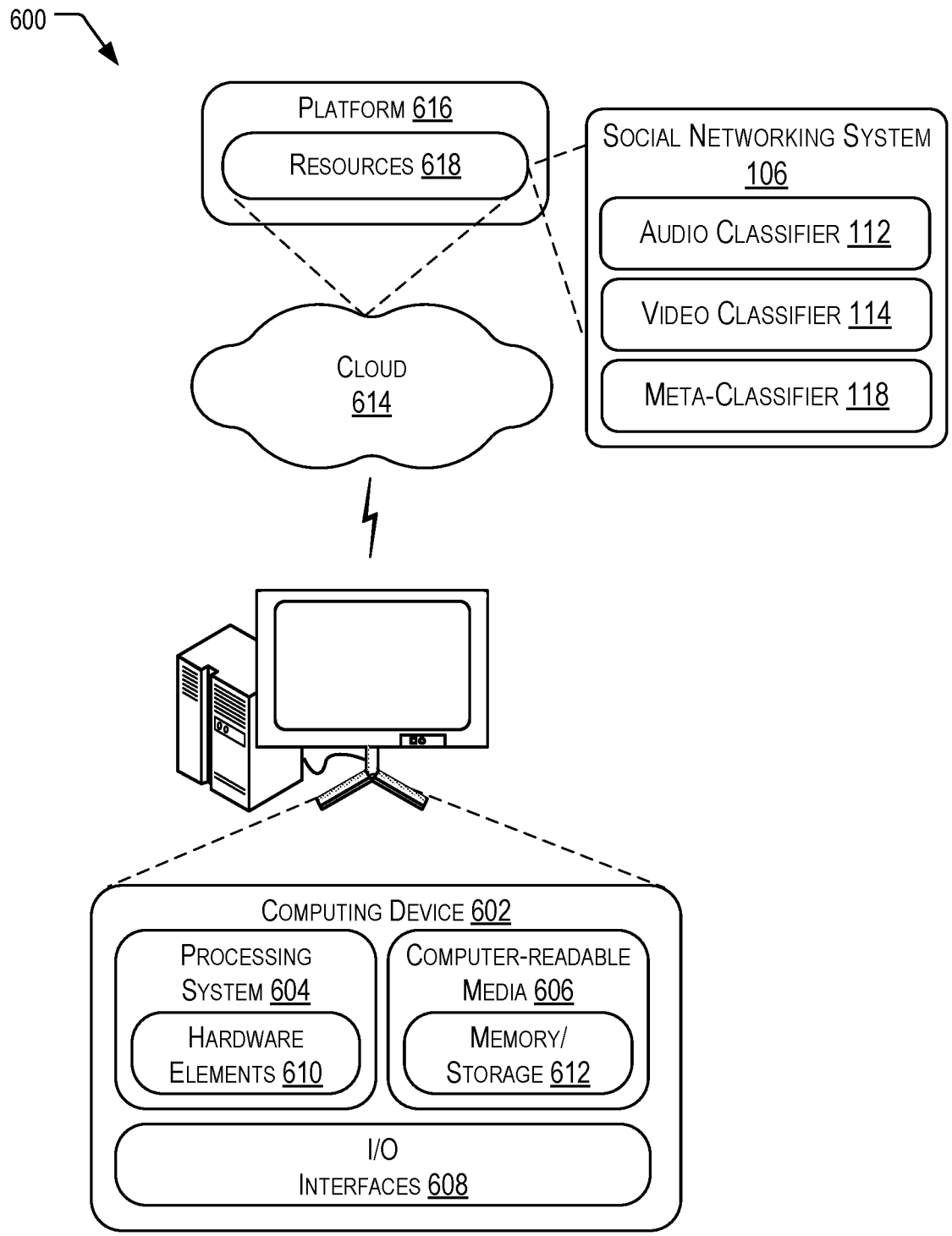
FIG. 6 illustrates an example system and device which may be used to implement the techniques described herein.

FIG. 6 illustrates an example system generally at 600 that includes an example computing device 602 that is representative of one or more computing systems and/or devices that may implement the various techniques described herein. This is illustrated through inclusion of the social networking system 106, the audio classifier 112, the video classifier 114, and the meta-classifier 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 602. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 602, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 610 and computer-readable media 606 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also be scalable to provide a corresponding level of scale to encountered demand for the resources 618 that are implemented via the platform 616. Accordingly, in an interconnected device embodiment, implementation of functionality described herein may be distributed throughout multiple devices of the system 600. For example, the functionality may be implemented in part on the computing device 602 as well as via the platform 616 which may represent a cloud computing environment 614.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving an audio signal;
inputting a portion of the audio signal into a machine-learned model trained to detect events in audio signals;
receiving, from the machine-learned model, a score associated with a sound included in the portion of the audio signal, the score representing a first probability of the sound being of a sound type on a frame level;
combining, as a combined score, the score associated with the sound with one or more scores of one or more other sounds included in the audio signal on a frame level, the one or more scores representing a second probability of the one or more other sounds being of the sound type, the combined score representing a recording-level probability and being based at least in part on a weighted average of the first probability and the second probability; and
controlling sharing of the audio signal with one or more user accounts based at least in part on the combined score for the audio signal.

2. The method of claim 1, wherein the audio signal is in the time domain and the portion is a first portion, the method further comprising:
generating a two-dimensional frequency domain representation of the audio signal by performing a Fourier transform on a time domain representation of the audio signal,
wherein inputting the portion of the audio signal into the machine-learned model comprises inputting a second portion of the two-dimensional frequency domain representation of the frequency domain corresponding to the first portion of the audio signal.

3. The method of claim 1, wherein the sound type comprises one or more of speech, a non-speech human sound, an animal sound, a gunshot, music, or an environmental sound.

4. The method of claim 1, wherein the sound type is speech and the machine-learned model is further trained to determine a semantic meaning of the speech, the method further comprising:
receiving, from the machine-learned model, a probability of offensiveness associated with the semantic meaning of the speech,
wherein controlling sharing of the audio signal is based at least in part on the probability of offensiveness associated with the semantic meaning of the speech.

5. The method of claim 1, wherein the sound type is first music, the method further comprising:
determining a music category of the first music; and
determining that a user account has played content including second music of the music category,
wherein controlling sharing of the audio signal comprises providing the audio signal as a recommendation to the user account based at least in part on the first music being of the music category and determining that the user account has played content including the second music of the music category.

6. The method of claim 1, wherein the audio signal is included in an item of content further comprising a video, the method further comprising determining the portion of the audio signal to input into the machine-learned model by:
determining a potentially offensive portion of the video; and
determining a time of the potentially offensive portion of the video,
wherein the portion is associated with a duration of time that includes the time.

7. The method of claim 1, wherein the machine-learned model is a first machine-learned model, the method further comprising:
inputting the score for the audio signal into a second machine-learned model trained to determine offensiveness of content;
receiving, from the second machine-learned model, an offensiveness level of an item of content that includes the audio signal,
wherein controlling the sharing of the audio signal is based at least in part on the offensiveness level.

8. The method of claim 1, wherein the combining further comprises aggregating the first probability and the second probability based at least in part on a linear softmax function to obtain the combined score.

9. The method of claim 1, wherein the machine-learned model comprises a convolutional and recurrent neural network.

10. A system comprising:
one or more processors; and
computer-readable media storing instructions that, when executed by the one or more processors, cause the system to perform operations comprising:
receiving an audio signal;
inputting a portion of the audio signal into a machine-learned model trained to detect events in audio signals;
receiving, from the machine-learned model, a score associated with a sound included in the portion of the audio signal, the score representing a first probability of the sound being of a sound type on a frame level;
combining, as a combined score, the score associated with the sound with one or more scores of one or more other sounds included in the audio signal on a frame level, the one or more scores representing a second probability of the one or more other sounds being of the sound type, the combined score representing a recording-level probability and being based at least in part on a weighted average of the first probability and the second probability; and
controlling sharing of the audio signal with one or more user accounts based at least in part on the combined score for the audio signal.

11. The system of claim 10, wherein the audio signal is in the time domain and the portion is a first portion, the operations further comprising:
generating a two-dimensional frequency domain representation of the audio signal by performing a transform on a time domain representation of the audio signal,
wherein inputting the portion of the audio signal into the machine-learned model comprises inputting a second portion of the two-dimensional frequency domain representation of the frequency domain corresponding to the first portion of the audio signal.

12. The system of claim 10, wherein the sound type is speech and the machine-learned model is further trained to determine a semantic meaning of the speech, the operations further comprising:
receiving, from the machine-learned model, a probability of offensiveness associated with the semantic meaning of the speech,
wherein controlling sharing of the audio signal is based at least in part on the probability of offensiveness associated with the semantic meaning of the speech.

13. The system of claim 10, wherein the sound type is first music, the operations further comprising:
determining a music category of the first music; and
determining that a user account has played content including second music of the music category,
wherein controlling sharing of the audio signal comprises providing the audio signal as a recommendation to the user account based at least in part on the first music being of the music category and determining that the user account has played content including the second music of the music category.

14. The system of claim 10, wherein the audio signal is included in an item of content further comprising a video, the operations further comprising determining the portion of the audio signal to input into the machine-learned model by:
determining a potentially offensive portion of the video; and
determining a time of the potentially offensive portion of the video,
wherein the portion is associated with a duration of time that includes the time.

15. The system of claim 10, wherein the machine-learned model is a first machine-learned model, the operations further comprising:
inputting the score for the audio signal into a second machine-learned model trained to determine offensiveness of content;
receiving, from the second machine-learned model, an offensiveness level of an item of content that includes the audio signal,
wherein controlling the sharing of the audio signal is based at least in part on the offensiveness level.

16. One or more non-transitory computer-readable media storing instructions that, when executed by one or more processors of a server computing device, cause the server computing device to perform operations comprising:
- receiving an audio signal;
- inputting a portion of the audio signal into a machine-learned model trained to detect events in audio signals;
- receiving, from the machine-learned model, a score associated with a sound included in the portion of the audio signal, the score representing a first probability of the sound being of a sound type on a frame level;
- combining, as a combined score, the score associated with the sound with one or more scores of one or more other sounds included in the audio signal on a frame level, the one or more scores representing a second probability of the one or more other sounds being of the sound type, the combined score representing a recording-level probability and being based at least in part on a weighted average of the first probability and the second probability; and
- controlling sharing of the audio signal with one or more user accounts based at least in part on the combined score for the audio signal.

17. The one or more non-transitory computer-readable media of claim 16, wherein the audio signal is in the time domain and the portion is a first portion, the operations further comprising:
- generating a two-dimensional frequency domain representation of the audio signal by performing a transform on a time domain representation of the audio signal, wherein inputting the portion of the audio signal into the machine-learned model comprises inputting a second portion of the two-dimensional frequency domain representation of the frequency domain corresponding to the first portion of the audio signal.

18. The one or more non-transitory computer-readable media of claim 16, wherein controlling sharing of the audio signal comprises sharing the audio signal in response to a search by the one or more user accounts, the search including a search term associated with the sound type.

19. The one or more non-transitory computer-readable media of claim 16, wherein controlling sharing of the audio signal comprises:
- determining an interest of the one or more user accounts based on prior content consumed by the one or more user accounts; and
- sharing the audio signal with the one or more user accounts responsive to the interest being associated with the sound type.

20. The one or more non-transitory computer-readable media of claim 16, wherein the sound is a first sound, and wherein controlling sharing of the audio signal comprises sharing the audio signal with the one or more user accounts based on a similarity of the sound type of the first sound to a second sound in one or more other audio signals consumed by the one or more user accounts.

* * * * *